US006506610B1

(12) United States Patent
Fassbind et al.

(10) Patent No.: US 6,506,610 B1
(45) Date of Patent: Jan. 14, 2003

(54) METHOD OF TRANSFERRING LIQUIDS USING A DEVICE HAVING PROCESS, WASTE AND PIPETTE TIP PARKING CHAMBERS

(75) Inventors: Walter Fassbind, Baar (CH); Werner Rey, Ebikon (CH)

(73) Assignee: Roche Diagnostics Corporation, Indianapolis, IN (US)

( * ) Notice: Subject to any disclaimer, the term of this patent is extended or adjusted under 35 U.S.C. 154(b) by 0 days.

(21) Appl. No.: 09/510,924

(22) Filed: Feb. 22, 2000

Related U.S. Application Data

(62) Division of application No. 09/093,776, filed on Jun. 9, 1998, now Pat. No. 6,063,341.

(30) Foreign Application Priority Data

Jun. 9, 1997 (EP) ............................................ 97109302

(51) Int. Cl.[7] ......................... G01N 35/00; G01N 35/10

(52) U.S. Cl. ............................ 436/180; 435/6; 436/174

(58) Field of Search ........................... 435/2, 6; 436/54, 436/174, 175, 177, 179, 180; 222/52, 320, 321.1, 333, 566

(56) References Cited

U.S. PATENT DOCUMENTS 5,389,339 A * 2/1995 Petschek et al. .............. 422/64

* cited by examiner

*Primary Examiner*—John Kim
(74) *Attorney, Agent, or Firm*—Gibbons, Del Deo, Dolan, Griffinger & Vecchione

(57) ABSTRACT

A method for transferring a liquid using a device having a waste chamber, a pipette tip parking chamber and at least one process chamber is disclosed. The liquid may be transferred between process chambers, or from one process chamber to the waste chamber, or from a primary sample tube external to the device to one process chamber, or from one process chamber to a specimen container external to said device, and wherein said transfer of the liquid is effected by means of pipetting operations carried out with said pipette tip. The method is particularly suitable for contamination-free processing of biological samples.

15 Claims, 4 Drawing Sheets

METHOD OF TRANSFERRING LIQUIDS USING A DEVICE HAVING PROCESS, WASTE AND PIPETTE TIP PARKING CHAMBERS

This is a divisional of application Ser. No. 09/093,776 filed on Jun. 9, 1998, U.S. Pat. No. 6,063,341.

BACKGROUND OF THE INVENTION

The invention relates to a disposable device for carrying out a process in which a biological sample is processed with one or more reagents.

The invention relates in particular to a disposable device which is suitable for carrying out a process for obtaining a purified nucleic acid sample from a biological sample.

The invention further relates to use of such a device for processing a fluid biological sample with one or more reagents in order to obtain a purified nucleic acid sample.

Known methods for obtaining a purified nucleic acid sample suitable to be amplified, by, for example, a polymerase chain reaction (PCR) are usually carried out manually and involve a number of steps and in particular a plurality of pipetting operations. Since contamination of the purified sample to be obtained has to be reduced as far as possible, the manual process has to be carried out with great care and is therefore a time consuming task.

Known apparatus for automatically carrying out pipetting operations in analyzer systems have been found inadequate for methods aiming to obtain purified nucleic acid samples suitable to be amplified, such as by a polymerase chain reaction (PCR), because contamination of the sample is likely to occur during pipetting operations.

SUMMARY OF THE INVENTION

A main object of the invention, therefore, is to provide a device to ensure a contamination-free automatic processing of samples and reagents to a degree which is sufficient to comply with the requirements of nucleic acid purification methods which provide nucleic acid samples having a high degree of purity and being thereby suitable to be amplified.

According to a first aspect of the invention, this problem is solved by a disposable process device which comprises an array of chambers integrally connected to each other, a cover insert removably connected to the array of chambers, and a disposable pipetting tip.

The integrally built array of chambers comprises an upper part shaped as an elongated tray and having an interior delimited by a bottom wall and a side wall which extends perpendicular to and along the perimeter of the bottom wall; a first process chamber having an open top end and a closed bottom end connected by a tubular wall which extends substantially perpendicular to the bottom wall of said upper part and downwardly from a first opening in said bottom wall, said first opening forming the open top end of the first process chamber; and a waste chamber for receiving waste liquids, said waste chamber having an open top end and a closed bottom end connected by a side wall which extends substantially perpendicular to the bottom wall of said upper part and downwardly from a second opening in said bottom wall, said second opening forming the open top end of the waste chamber.

The cover insert is configured and dimensioned to be inserted in the chamber array and the cover insert comprises an elongated cover having openings providing access to the process chamber and the waste chamber respectively when said cover insert is inserted in said chamber array; and a parking chamber for parking therein said disposable pipetting tip, said parking chamber having an open top end and a closed bottom end connected by a tubular wall which extends substantially perpendicular to the cover and downwardly from an opening in the cover.

The disposable pipetting tip is configured and dimensioned to be at least partially inserted in the interior of the parking chamber.

According to a second aspect of the invention, the contamination-free automated processing of samples and reagents is attained by using a device according to the invention for carrying out a process wherein a fluid biological sample is processed with one or more reagents. This process comprises steps of automatic transfer of liquids from a process chamber to the waste chamber, or from a primary sample tube external to the device to the first process chamber, or from a process chamber to a specimen container external to the device, and wherein said transfer of liquids is effected by means of pipetting operations carried out exclusively with the disposable pipette tip which is part of the device.

The main advantage of the device and of the process according to the invention is that they make possible a contamination-free automatic processing of samples and reagents to a degree which is sufficient to comply with the requirements of nucleic acid purification methods which provide nucleic acid samples having a high degree of purity and being thereby suitable to be amplified, such as by a polymerase chain reaction (PCR).

A further advantage of the device according to the invention is that a plurality of these devices can be used simultaneously in an automatic apparatus to obtain a corresponding plurality of purified nucleic acid samples from respective biological samples.

A specific advantage of an embodiment of the device according to the invention comprising only one process chamber is that it is cheaper than a device comprising more than one process chamber, and that the small size of the device contributes to less waste material which must be disposed of after use of the device, and it reduces the cost of packaging material therefor.

A preferred embodiment of the device according to the invention is characterized in that the cover comprises a first channel which provides access to the interior of the process chamber for dispensing a liquid into this chamber. This dispensing is typically effected with a pipetting cannula other than the disposable pipetting tip. The advantage of this embodiment is that the channel mentioned ensures that during the pipetting operation the tip of the pipetting cannula is located within a substantially closed environment which prevents accidental contamination during the transfer of liquid from the pipetting cannula to the process chamber.

A further preferred embodiment of the device according to the invention is characterized in that a substantial part of the parking chamber is located within the waste chamber when said cover insert is inserted into said array of chambers. This configuration advantageously reduces the space occupied by the device, because no additional space is necessary for the parking chamber.

In another preferred embodiment of the device according to the invention, the process chamber depends freely downwardly from the bottom wall of said upper part of chamber array. This configuration offers the advantage that the lower part of the process chamber is accessible to external means, e.g. magnets, used to obtain separation of magnetic particles in suspension in a liquid contained in the process chamber.

A further preferred embodiment of the device according to the invention is characterized in that the integrally built array of chambers further comprises a second process chamber having an open top end and a closed bottom end connected by a tubular wall which extends substantially perpendicular to the bottom wall of said upper part and downwardly from a third opening in said bottom wall. The third opening forms the open top end of the second process chamber. The advantage of this embodiment is that it offers more flexibility with regard to the sequence of process steps for carrying out a particular method. This flexibility is increased e.g. by maintaining the process chambers at different temperatures, e.g. one at 60° C. and the other at 37° C., or by using one of the process chambers for provisional storage of a reagent before it is transferred to the other process chamber.

A preferred embodiment of the device according to the invention and comprising two process chambers is characterized in that the bottom wall of said upper part comprises a second channel which provides access to the interior of the second process chamber for dispensing a liquid into this chamber. This dispensing is typically effected with a pipetting cannula other than the disposable pipetting tip. The advantage of this embodiment is that the second channel ensures that during the pipetting operation the tip of the pipetting cannula is located within a substantially closed environment which prevents accidental contamination during the transfer of liquid from the pipetting cannula to the second process chamber.

Another preferred embodiment of the device according to the invention and comprising two process chambers is characterized in that the first process chamber, the waste chamber and the second process chamber are arranged in a row. This linear configuration advantageously simplifies the arrangement of a plurality of devices according to the invention in an automatic processing apparatus and also the transport means used for moving the disposable pipetting tip and the pipetting cannula to their pipetting positions with respect to the various chambers of the device.

Another preferred embodiment of the device according to the invention and comprising two process chambers is characterized in that the waste chamber is located between the first process chamber and the second process chamber. This configuration advantageously reduces the motion paths of the disposable pipetting tip and the pipetting cannula necessary to bring these to their pipetting positions with respect to the various chambers of the device.

A further preferred embodiment of the device according to the invention and comprising two process chambers is characterized in that the second process chamber depends freely downwardly from the bottom wall of said upper part of chamber array. This configuration offers the advantage that the lower part of the second process chamber is accessible to external means, e.g. magnets, used to obtain separation of magnetic particles in suspension in a liquid contained in the second process chamber.

Preferred embodiments of the device according to the invention are characterized in that the array of chambers of the device according to the invention is a single piece of plastic material.

Preferred embodiments of the device according to the invention are characterized in that said cover insert of the device according to the invention is a single piece of plastic material.

These preferred embodiments make it possible to reduce the manufacture price of the device.

A preferred use of the device according to the invention is for carrying out a process characterized in that it comprises steps of dispensing a liquid reagent from a reagent container external to the device into the process chamber, said dispensing being effected with a pipetting cannula other than the disposable tip which is part of the device.

A preferred use of the device according to the invention and comprising two process chambers is a process which comprises the steps of automatic transfer of liquids from the first process chamber into the second process chamber or vice versa, or from the first or the second process chamber to the waste chamber, or from a primary sample tube external to the device to the first or the second process chamber, or from the first or the second process chamber to a specimen container external to the device, and wherein said transfer of liquids is effected by means of pipetting operations carried out exclusively with the disposable tip which is part of the device.

A further preferred use of the device according to the invention and comprising two process chambers is a process which comprises the steps of dispensing a liquid reagent from a reagent container external to the device into the first process chamber or the second process chamber, said dispensing being effected with a pipetting cannula other than the disposable tip which is part of the device.

A preferred use of the device according to the invention is a process for isolating a nucleic acid contained in a biological sample.

Preferred embodiments of the invention are described below, by way of example, with reference to the accompanying drawings wherein:

DETAILED DESCRIPTION OF THE INVENTION

Figure 1:
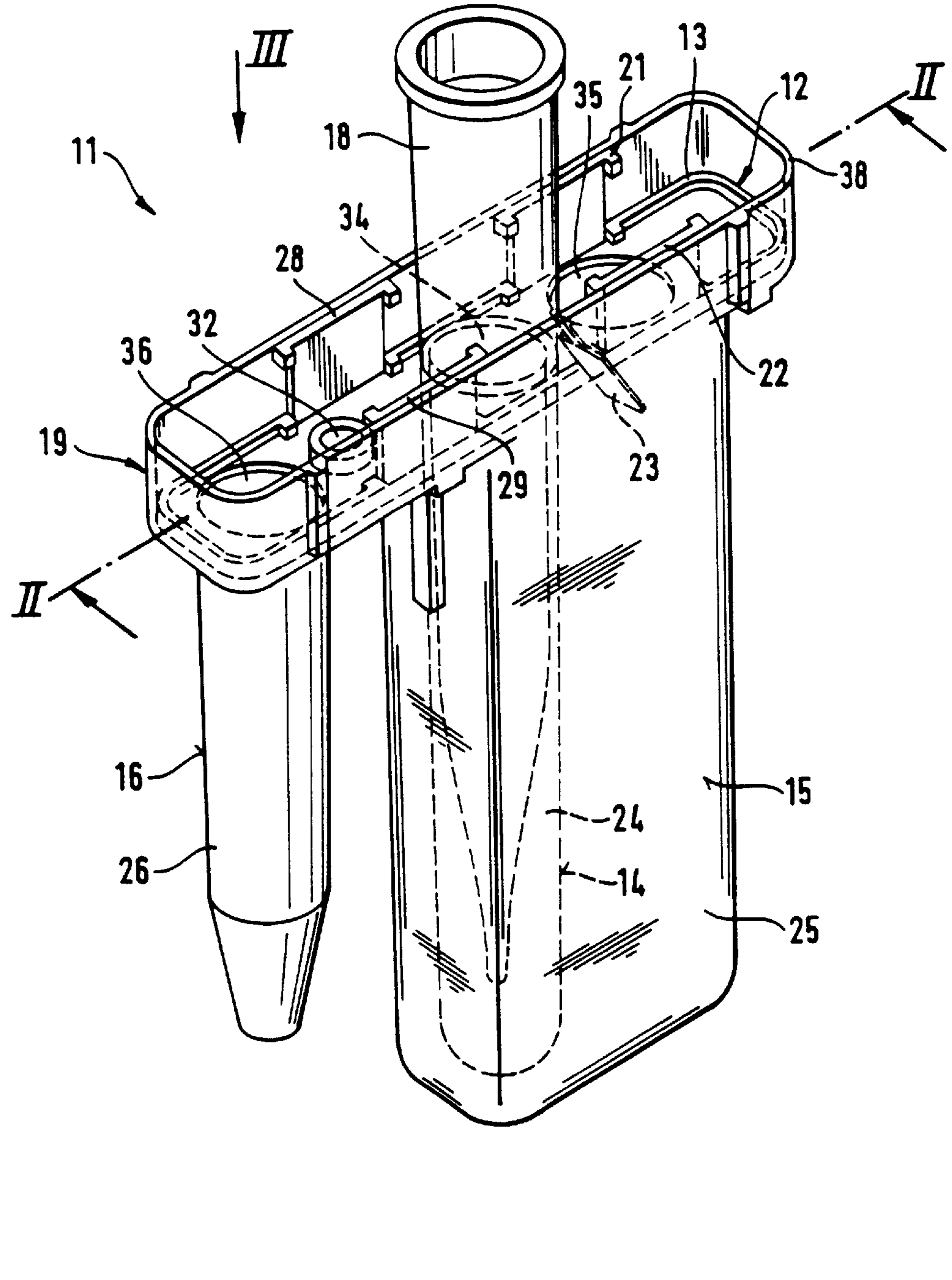
FIG. 1 is a perspective view of a first embodiment of device according to the invention.
Figure 2:
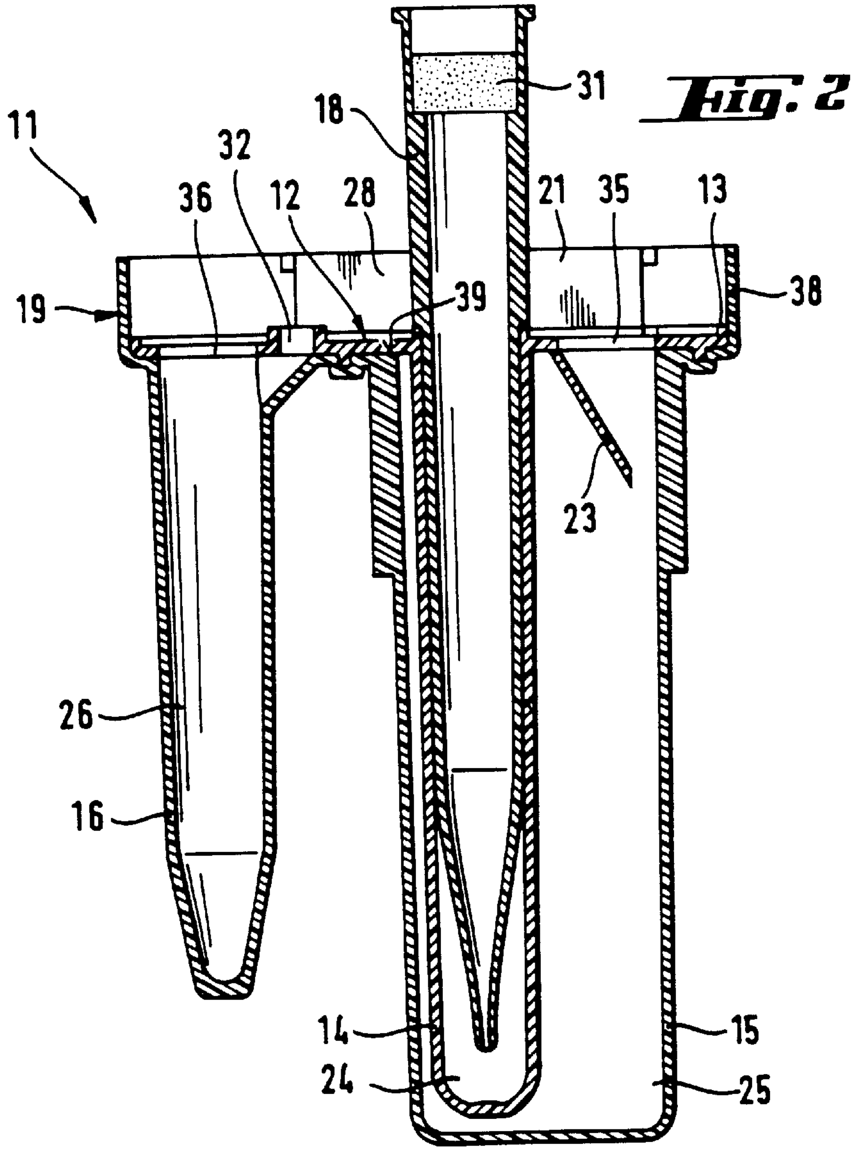
FIG. 2 is a view of a cross-section on line II—II in FIG. 1
Figure 3:
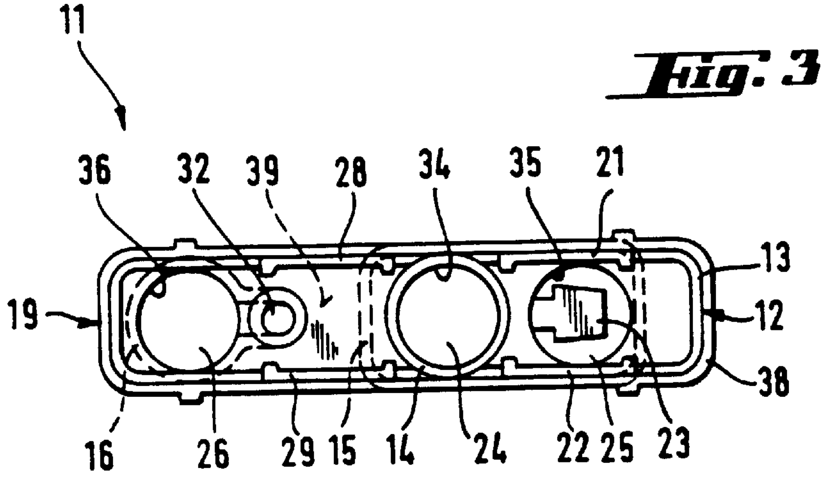
FIG. 3 is a top plan view of the device according to FIG. 1.

FIG. 1 to 3 show a first embodiment of a device 11 according to the invention. This first embodiment comprises an integrally built array of chambers 19, an integrally built cover insert 12 and a disposable pipetting tip 18. Array of chambers 19 and cover insert 12 are assembled together by inserting cover insert 12 into the upper part of array of chambers 19. FIGS. 1 and 2 show this assembly.

Array of chambers 19 comprises an upper part which is shaped as an elongated tray and which has an interior delimited by a bottom wall 39 and a side wall 38 which extends perpendicular to and along the perimeter of bottom wall 39; a process chamber 26; and a waste chamber 25 for receiving waste liquids.

Process chamber 26 has an open top end and a closed bottom end connected by a tubular wall 16 which extends substantially perpendicular to bottom wall 39 of the upper part of array of chambers 19 and downwardly from a first opening in bottom wall 39. This first opening forms the open top end of first process chamber 26. Process chamber 26 depends freely downwardly from the bottom wall 39 of the upper part of chamber array 19.

Waste chamber 25 has an open top end and a closed bottom end connected by a side wall 15 which extends substantially perpendicular to bottom wall 39 of the upper part of array of chambers 19 and downwardly from a second opening in bottom wall 39. This second opening forms the open top end of waste chamber 25.

Cover insert 12 is configured and dimensioned to be inserted in chamber array 19. Cover insert 12 comprises an elongated cover 13 having openings 36 and 35 providing access to process chamber 26 and to waste chamber 25 respectively when cover insert 12 is inserted in chamber array 19; and a parking chamber 24 for parking therein the disposable pipetting tip 18.

In a preferred embodiment cover 13 includes a jet deflector 23 which has the position shown in particular by FIG. 2 and which serves for deflecting a jet of liquid pipetted into waste chamber 25. Jet deflector 23 prevents such a jet from impinging directly onto the free surface of liquid already contained in waste chamber 25. Such impact is undesirable, because in some cases it may cause splashing and expel some droplets out of waste chamber 25 through opening 35.

Parking chamber 24 has an open top end and a closed bottom end connected by a tubular wall 14 which extends substantially perpendicular to cover 13 and downwardly from an opening 34 in cover 13. In a preferred embodiment the top end of tubular wall 14 of parking chamber 24 lies above cover 13.

Disposable pipetting tip 18 is configured and dimensioned to be at least partially inserted in the interior of parking chamber 24. Disposable pipetting tip 18 has a tubular wall part of which snugly fits into the interior of parking chamber 24. The lower end of pipetting tip is desirably kept at some distance from the bottom and from the side walls of parking chamber 24.

The upper part of disposable pipetting tip 18 is so configured and dimensioned that it can be gripped and held by a suitable pipetting tip-gripper (not shown) which is part of pipetting tip transport means of an automatic apparatus (not shown) so that pipetting tip 18 can be moved by the pipetting tip-gripper to different pipetting positions within the apparatus. Preferably the pipetting tip-gripper is such that when it grips tip 18 it fluidically connects this tip with a dosing pipettor (not shown) included in the automatic apparatus.

In the preferred embodiment shown by FIG. 2 a filter 31 is located within the upper part of pipetting tip 18. Filter 31 serves to prevent contamination by carry-over of gas or liquid during pipetting operations.

In the preferred embodiment shown by FIGS. 1 to 3 pipetting tip 18 is so configured and dimensioned that it can also be used as closure of the waste chamber 25 when the lower part of pipetting tip 18 is inserted through opening 35 into the waste chamber 25.

The shape of cover insert 12 is such that it can be gripped and held by a suitable gripper (not shown) which is part of transport means of an automatic apparatus (not shown) so that cover insert 12 and thereby the entire device 11 can be moved by the gripper to different positions within the apparatus, e.g. from a parking position, where an array of devices 11 is positioned side by side, to an incubator position.

In the preferred embodiment shown by FIGS. 1 to 3 cover insert 12 has an array of four tangs 21, 22, 28, 29 arranged as shown by the figures.

In a preferred embodiment the configuration and dimensions of this array of tangs and the configuration and dimensions of the upper part of disposable pipetting tip 18 are so chosen that the top of the pipetting tip 18 or a couple of tangs, e.g. 21 and 22 or 28 and 29 can be gripped with the same gripper.

Cover 13 comprises a first channel 32 which provides access to the interior of the first process chamber 26 for pipetting into this chamber a reagent from a reagent container located outside device 11. This pipetting operation is effected with a pipetting cannula (not shown in the figures) other than disposable pipetting tip 18.

As shown by FIGS. 1 and 2 a substantial part of parking chamber 24 is located within waste chamber 25 when cover insert 12 is inserted into array of chambers 19.

Figure 4:
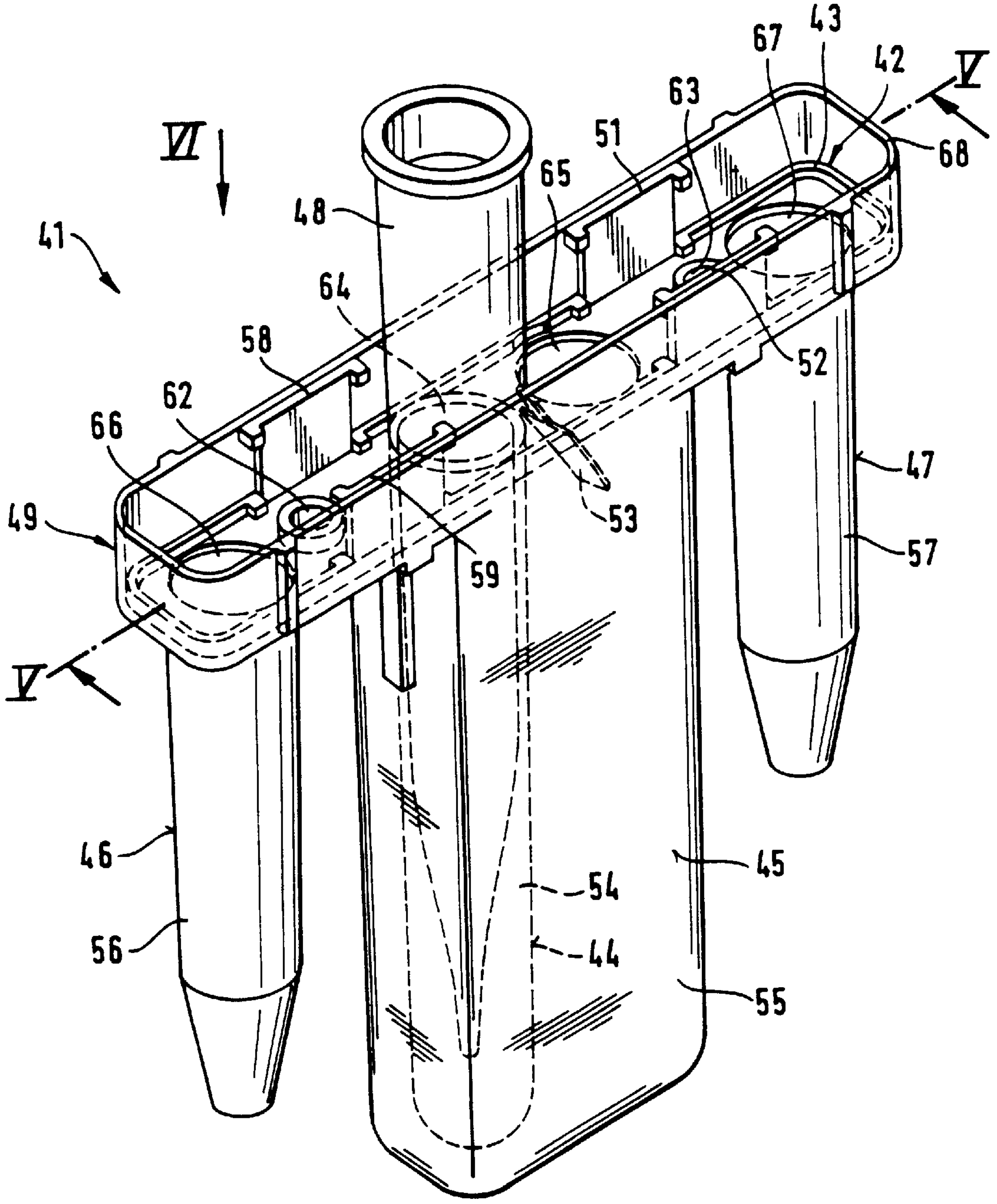
FIG. 4 is a perspective view of a second embodiment of device according to the invention.
Figure 5:
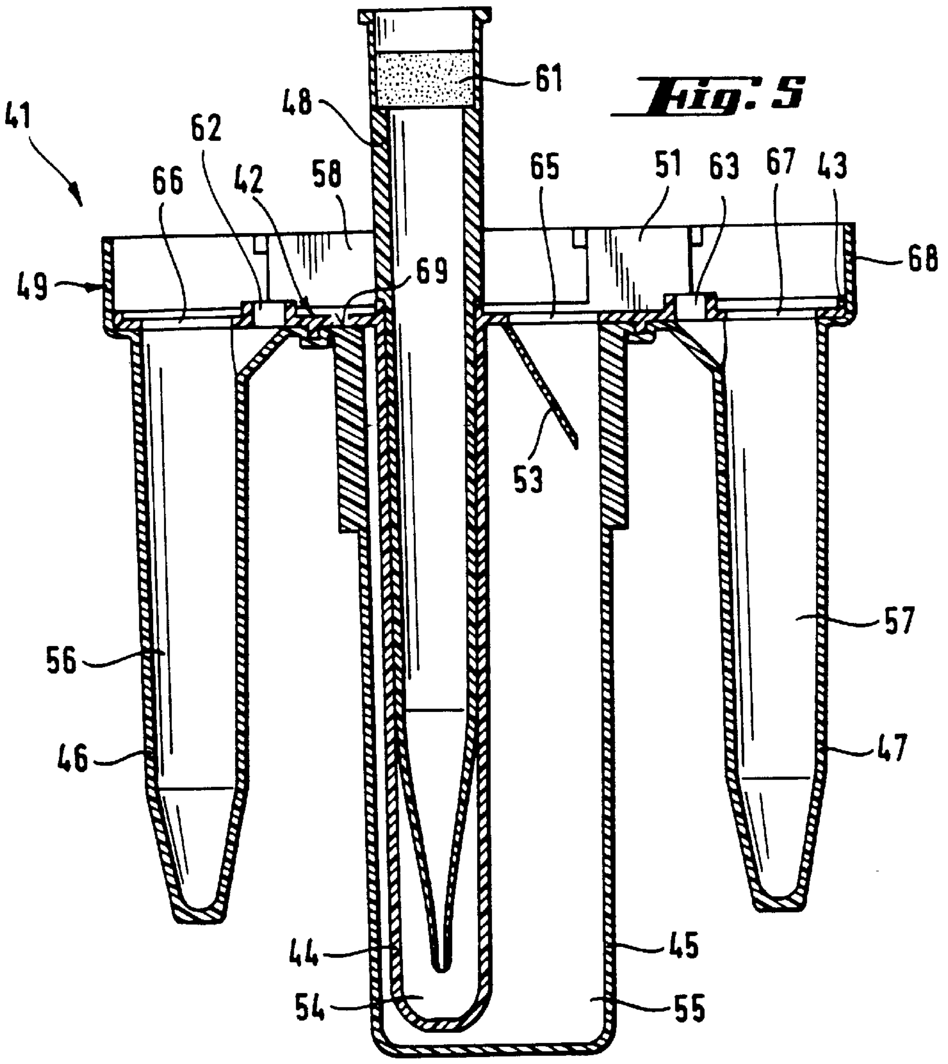
FIG. 5 is a view of a cross-section on line V—V in FIG. 4
Figure 6:
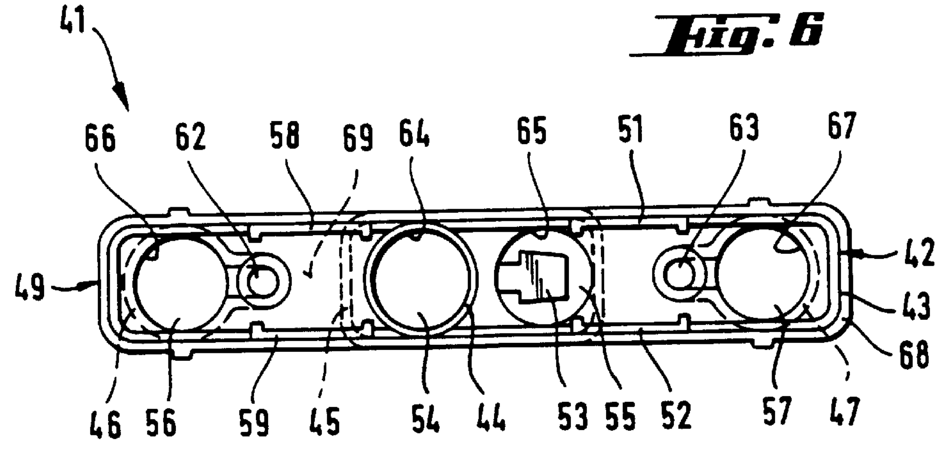
FIG. 6 is a top plan view of the device according to FIG. 4.

FIGS. 4 to 6 show a second embodiment of a device 41 according to the invention. This second embodiment comprises an integrally built array of chambers 49, an integrally built cover insert 42 and a disposable pipetting tip 48. Array of chambers 49 and cover insert 42 are assembled together by inserting cover insert 42 into the upper part of array of chambers 49. FIGS. 4 and 5 show this assembly.

Array of chambers 49 comprises an upper part which is shaped as an elongated tray and which has an interior delimited by a bottom wall 69 and a side wall 68 which extends perpendicular to and along the perimeter of bottom wall 69; a first process chamber 56; a second process chamber 57; and a waste chamber 55 for receiving waste liquids.

Process chamber 56 has an open top end and a closed bottom end connected by a tubular wall 46 which extends substantially perpendicular to bottom wall 69 of the upper part of array of chambers 49 and downwardly from a first opening 66 in bottom wall 69. This first opening forms the open top end of first process chamber 56.

Process chamber 57 has an open top end and a closed bottom end connected by a tubular wall 47 which extends substantially perpendicular to bottom wall 69 of the upper part of array of chambers 49 and downwardly from a first opening in bottom wall 69. This first opening forms the open top end of process chamber 57.

Process chamber 56 and process chamber 57 depend freely downwardly from the bottom wall 69 of the upper part of chamber array 49.

Waste chamber 55 has an open top end and a closed bottom end connected by a side wall 45 which extends substantially perpendicular to bottom wall 69 of the upper part of array of chambers 49 and downwardly from a second opening in bottom wall 69. This second opening forms the open top end of waste chamber 55.

Cover insert 42 is configured and dimensioned to be inserted in chamber array 49. Cover insert 42 comprises an elongated cover 43 having openings 66, 65 and 67 providing access to process chamber 56, to waste chamber 55, and to process chamber 57 respectively when cover insert 42 is inserted in chamber array 49; and a parking chamber 54 for parking therein the disposable pipetting tip 48.

In a preferred embodiment cover 43 includes a jet deflector 53 which has the position shown in particular by FIG. 5 and which serves for deflecting a jet of liquid pipetted into waste chamber 55. Jet deflector 53 prevents such a jet from impinging directly onto the free surface of liquid already contained in waste chamber 55. Such impact is undesirable, because in some cases it may cause splashing and expel some droplets out of waste chamber 55 through opening 65.

Parking chamber 54 has an open top end and a closed bottom end connected by a tubular wall 44 which extends substantially perpendicular to cover 43 and downwardly from an opening 64 in cover 43. In a preferred embodiment the top end of tubular wall 44 of parking chamber 54 lies above cover 43.

Disposable pipetting tip 48 is configured and dimensioned to be at least partially inserted in the interior of parking chamber 54. Disposable pipetting tip 48 has a tubular wall part of which snugly fits into the interior of parking chamber 54. The lower end of pipetting tip is desirably kept at some distance from the bottom and from the side walls of parking chamber 54.

The upper part of disposable pipetting tip 48 is so configured and dimensioned that it can be gripped and held by a suitable pipetting tip-gripper (not shown) which is part of pipetting tip transport means of an automatic apparatus (not shown) so that pipetting tip 48 can be moved by the pipetting tip-gripper to different pipetting positions within the apparatus. Preferably the pipetting tip-gripper is such that when it grips tip 48 it fluidically connects this tip with a dosing pipettor (not shown) included in the automatic apparatus. In the preferred embodiment shown by FIG. 5 a filter 61 is located within the upper part of pipetting tip 48. Filter 61 serves to prevent contamination by carry-over of gas or liquid during pipetting operations.

In the preferred embodiment shown by FIGS. 4 to 6 pipetting tip 48 is so configured and dimensioned that it can also be used as closure of the waste chamber 55 when the lower part of pipetting tip 48 is inserted through opening 65 into the waste chamber 55.

The shape of cover insert 42 is such that it can be gripped and held by a suitable gripper (not shown) which is part of transport means of an automatic apparatus (not shown) so that cover insert 42 and thereby the entire device 41 can be moved by the gripper to different positions within the apparatus, e.g. from a parking position, where an array of devices 41 is positioned side by side, to an incubator position.

In the preferred embodiment shown by FIGS. 4 to 6 cover insert 42 has an array of four tangs 51, 52, 58, 59 arranged as shown by the figures.

In a preferred embodiment the configuration and dimensions of this array of tangs and the configuration and dimensions of the upper part of disposable pipetting tip 48 are so chosen that the top of the pipetting tip 48 or a couple of tangs, e.g. 51 and 52 or 58 and 59, can be gripped with the same gripper.

Cover 43 comprises a first channel 62 which provides access to the interior of the first process chamber 56 for pipetting into this chamber a reagent from a reagent container located outside device 41. Cover 43 further comprises a second channel 63 which provides access to the interior of the second process chamber 57 for pipetting into this chamber a reagent from a reagent container located outside device 41. These pipetting operations are effected with a pipetting cannula (not shown in the figures) other than disposable pipetting tip 48.

As shown by FIGS. 4 and 5 a substantial part of parking chamber 54 is located within waste chamber 55 when cover insert 42 is inserted into array of chambers 49.

In a preferred embodiment the first process chamber 56, the waste chamber 55 and the second process chamber 57 are linearly arranged in a row.

In a further preferred embodiment the waste chamber 55 is located between the first process chamber 56 and the second process chamber 57.

In preferred embodiments of a device according to the invention the array of chambers 19 and 49, respectively are a single piece of a suitable plastic material, e.g. a polypropylene. In preferred embodiments, the cover insert 12 and 42, respectively, is a single piece of a suitable plastic material, e.g. a polypropylene.

When device 11 described above with reference to FIGS. 1–3 is used for processing a fluid biological sample with one or more reagents in process chamber 26, such a process comprises steps of automatic transfer of liquids from the process chamber 26 to the waste chamber 25, or from a primary sample tube external to the device to the process chamber 26, or from the first process chamber 26 to a specimen container external to the device. According to the invention these transfers of liquids are effected by means of pipetting operations carried out exclusively with the disposable tip 18 which is part of the device 11, whereas steps of dispensing a liquid reagent from a reagent container external to the device into the first process chamber 26 are effected with a pipetting cannula other than the disposable tip 18 which is part of the device 11.

When device 41 described above with reference to FIGS. 4–6 is used for processing a fluid biological sample with one or more reagents in process chambers, such a process comprises steps of automatic transfer of liquids from the first process chamber 56 into the second process chamber 57 or vice versa, or from the first or the second process chamber 56, 57 to the waste chamber 55, or from a primary sample tube external to the device to the first or the second process chamber 56, 57, or from the first or the second process chamber 56, 57 to a specimen container external to the device. According to the invention these transfers of liquids are effected by means of pipetting operations carried out exclusively with the disposable tip 48 which is part of the device 41, whereas steps of dispensing a liquid reagent from a reagent container external to the device into the first process chamber 56 or the second process chamber 57 are effected with a pipetting cannula other than the disposable tip 48 which is part of the device 41.

A preferred use of device 41 according to the invention is for carrying out a process for isolating a nucleic acid contained in a biological sample. Such a process comprises for instance the following steps:

A) Device 41 is transferred by gripper of transport mechanism of an automatic apparatus from a storage position to an incubating position in an incubator.

B) A lysis solution from an external container is pipetted into process chamber 56 by means of a pipetting cannula of an automatic pipetting device.

C) A predetermined volume of a fluid biological sample from an external container is pipetted into process chamber 56 by means of disposable tip 48 of device 41.

D) An internal quality standard solution from an external container is pipetted into process chamber 56 by means of a pipetting cannula of an automatic pipetting device.

E) A probe solution from an external container is pipetted into process chamber 57 by means of a pipetting cannula of an automatic pipetting device.

F) The mixture contained in process chamber 56 is incubated at 60°.

G) The entire liquid mixture contained in process chamber 56 is pipetted into process chamber 57 by means of pipetting tip 48.

H) The mixture contained in process chamber 57 is incubated at 37°.

I) A bead (solid phase) solution from an external container is pipetted into process chamber 57 by means of a pipetting cannula of an automatic pipetting device.

J) The mixture contained in process chamber 57 is incubated at 37°.

K) Device 41 is transferred by gripper of transport mechanism of an automatic apparatus from the incubating position in an incubator to a processing position in a separation and washing station of the automatic apparatus.

L) At the separation and washing station several washing steps of the beads contained in process chamber 57 are carried out and waste liquid is transferred from this chamber to waste chamber 55 means of disposable tip 48.

M) Target solution remaining in process chamber 57 and containing isolated nucleic acid is pipetted into an external specimen container by means of disposable tip 48.

What is claimed is:

1. A method for carrying out a process wherein a fluid biological sample is processed with one or more reagents, using a device having a first process chamber, a waste chamber and a chamber for parking a pipetting tip associated with said device, the process comprising a plurality of the following steps of automatically transferring a liquid (i) from the first process chamber to the waste chamber, (ii) from a primary sample tube external to the device to the first process chamber, and (iii) from the first process chamber to a specimen container external to the device, and wherein said transfer of the liquid in each step in said plurality is effected by means of pipetting operations carried out with said pipette tip and said pipetting tip being parked in said parking chamber between said plurality of pipetting operations.

2. A method according to claim 1, wherein the process further comprises steps of dispensing a liquid reagent from a reagent container external to the device into the first process chamber, said dispensing being effected with a pipetting cannula other than the pipetting tip.

3. A method for carrying out a process wherein a fluid biological sample is processed with one or more reagents, using a device having a first process chamber, a second process chamber, a waste chamber and a chamber for parking a pipetting tip associated with said device, the process comprising a plurality of the following steps of automatically transferring a liquid (i) from the first process chamber into the second process chamber or vice versa, (ii) from the first or the second process chamber to the waste chamber, (iii) from a primary sample tube external to the device to the first or the second process chamber, and (iv) from the first or the second process chamber to a specimen container external to the device, and wherein said transfer of the liquid in each step in said plurality is effected by means of pipetting operations carried out with said pipette tip and said pipetting tip being parked in said parking chamber between said plurality of pipetting operations.

4. A method according to claim 3, wherein the process further comprises steps of dispensing a liquid reagent from a reagent container external to the device into the first process chamber or the second process chamber, said dispensing being effected with a pipetting cannula other than the pipette tip.

5. A method according to claim 1 wherein the process is a process for isolating a nucleic acid contained in the biological sample.

6. A method according to claim 2 wherein the process is a process for isolating a nucleic acid contained in the biological sample.

7. A method according to claim 3 wherein the process is a process for isolating a nucleic acid contained in the biological sample.

8. A method according to claim 4 wherein the process is a process for isolating a nucleic acid contained in the biological sample.

9. A method according to claim 4 wherein said waste chamber is between said first process chamber and said second process chamber.

10. A method according to claim 1 wherein said pipette tip is disposable.

11. A method according to claim 4 wherein said pipette tip is disposable.

12. A method according to claim 1 wherein said pipette tip is fabricated of plastic.

13. A method according to claim 4 wherein said pipette tip is fabricated of plastic.

14. A method according to claim 1 wherein said pipette tip belongs to said device.

15. A method according to claim 4 wherein said pipette tip belongs to said device.

* * * * *